(12) United States Patent
Liu et al.

(10) Patent No.: US 7,131,750 B2
(45) Date of Patent: Nov. 7, 2006

(54) BACKLIGHT APPARATUS

(75) Inventors: Cheng-You Liu, Taipei (TW); Kai-Yu Sun, Jhudong Township, Hsinchu County (TW)

(73) Assignee: AU Optronics Corporation, Hsinschu (TW)

( * ) Notice: Subject to any disclaimer, the term of this patent is extended or adjusted under 35 U.S.C. 154(b) by 82 days.

(21) Appl. No.: 10/909,175

(22) Filed: Jul. 29, 2004

(65) Prior Publication Data

US 2006/0023472 A1 Feb. 2, 2006

(51) Int. Cl.
*F21V 5/00* (2006.01)
*F21V 7/04* (2006.01)

(52) U.S. Cl. ............ 362/327; 362/606; 362/608; 362/609

(58) Field of Classification Search ........ 362/606–609, 362/614, 327, 216, 256, 632–634, 260, 225, 362/217, 368, 29, 30; 349/61
See application file for complete search history.

(56) References Cited

U.S. PATENT DOCUMENTS

| | | | |
|---|---|---|---|
| 6,206,545 B1 * | 3/2001 | Yan .................. | 362/249 |
| 6,914,646 B1 * | 7/2005 | Kim .................. | 349/65 |
| 6,960,891 B1 * | 11/2005 | Park et al. .......... | 315/229 |
| 6,974,221 B1 * | 12/2005 | Wu et al. ............ | 362/29 |
| 6,979,102 B1 * | 12/2005 | You .................. | 362/218 |
| 2004/0257792 A1 * | 12/2004 | Yu et al. ............ | 362/31 |
| 2005/0122444 A1 * | 6/2005 | Kuo et al. .......... | 349/61 |
| 2005/0146782 A1 * | 7/2005 | Takeyama et al. .... | 359/337.1 |

FOREIGN PATENT DOCUMENTS

| | | |
|---|---|---|
| JP | 04-275525 | 10/1992 |
| JP | 05-323312 | 12/1993 |
| JP | 07-270786 | 10/1995 |
| JP | 07-272521 | 10/1995 |
| JP | 10-326517 | 12/1998 |
| JP | 11-329040 | 11/1999 |
| JP | 2000-310778 | 11/2000 |
| JP | 2001-210126 | 8/2001 |
| JP | 2001-216807 | 8/2001 |
| JP | 2001-222853 | 8/2001 |
| JP | 2001-297623 | 10/2001 |
| JP | 2001-356702 | 12/2001 |
| JP | 2005-174910 | 6/2005 |

* cited by examiner

*Primary Examiner*—Renee Luebke
*Assistant Examiner*—Evan Dzierzynski
(74) *Attorney, Agent, or Firm*—Duane Morris, LLP

(57) ABSTRACT

A backlight apparatus includes a plurality of support members that maintain a diffuser plate in a fixed and level position with respect to the lamps and the housing that contains the lamps, to produce uniform illumination. The support members extend from the diffuser plate disposed at an open face of the housing, to the opposed back part of the housing, and include male-female interlocking parts to provide support. The support members include a set of cooperating portions, an upper and lower portion. The upper and lower portions may combine to provide a cavity in the support member. A cold cathode fluorescent lamp may extend through the cavity and the upper and lower portions may be secured to the diffuser plate and housing, respectively, by extending through openings formed in the diffuser plate or housing.

25 Claims, 3 Drawing Sheets

BACKLIGHT APPARATUS

FIELD OF THE INVENTION

This invention relates most generally to a video display device. More particularly, the invention relates to a cold cathode fluorescent lamp (CCFL) backlight device used in conjunction with a liquid crystal display (LCD).

BACKGROUND

Liquid crystal displays (LCD's) used in televisions, computers, and other video display devices produce predetermined images and control light transmission to produce video displays. LCD's are particularly suited for flat panel displays because of their superiority in resolution, color image display and image quality. LCD's do not emit light themselves and therefore utilize backlight devices behind the LCD panel to produce a visible video display. Cold cathode fluorescent lamps (CCFL's) have been used for various illumination purposes and are particularly suited for use as a backlight apparatus in conjunction with liquid crystal displays such as TFT-LCD's (thin film transistor-liquid crystal displays) in televisions, computers, and other video display technologies. The performance and quality of the video display is optimized when the illumination is sufficient and uniform throughout the display. Non-uniform illumination degrades the quality of the displayed image. Technological advances in the video display industry enable the reliable production of increasingly large video displays and as video display devices become larger, it becomes increasingly more challenging and important to provide a uniformly illuminated display device.

LCD panels used in televisions and other video display devices, typically utilize a CCFL backlight apparatus that consists of a housing that contains numerous elongated tubes of cold cathode fluorescent lamps and includes reflective internal surfaces. The housing typically includes a generally flat, reflective back portion and an open face that faces the LCD, but the housing is generally separated from the LCD by several layers of material that condition the light as it travels from the CCFL backlight apparatus to the liquid crystal display. For example, a diffuser plate and one or more multilevel diffusers may be present between the backlight apparatus and the liquid crystal display. Additionally, one or more prism sheets may be included between the diffusers if more than one diffuser is used. A deformation of the diffuser plate, the diffusers, or the prism sheets can result in non-uniform illumination provided to the LCD array and therefore an video image of inferior quality is seen by the viewer. When the CCFL backlight apparatus is of considerable size and a correspondingly sized diffuser plate is disposed against or in close proximity to the open face of the backlight apparatus housing, a common problem is for the diffuser plate to sag or deform so that it is not level with respect to the backlight apparatus. This produces an undesirable non-uniformity of illumination.

It would therefore be desirable to provide a backlight apparatus that delivers uniform illumination to a display device regardless of the size of the display device. In particular, it would be desirable to support the diffuser plate at a level orientation with respect to the backlight device.

SUMMARY OF THE INVENTION

To address these and other objects and in view of its purposes, the present invention provides a backlight apparatus that includes a housing with a bottom, sides and an open face opposite the bottom. The housing includes an internal reflective surface. At least one cold cathode fluorescent lamp is disposed within the housing. At least a diffuser plate is disposed over the housing. A rigid support member contacts the bottom of the housing and the diffuser plate, and the cold cathode fluorescent lamp extends through the support member.

In another embodiment, the present invention provides a backlight apparatus that includes a housing with a bottom, sides and an open face opposite the bottom. The housing includes an internal reflective surface and at least a lamp disposed within the housing. At least a diffuser plate is disposed over the housing. A support member supports the diffuser plate. The support member includes two separate pieces—a lower portion extending through an opening formed in the bottom of the housing, and an upper portion contacting the lower portion and extending though an opening formed in the diffuser plate.

In another embodiment, the present invention provides a backlight apparatus comprising a housing including a bottom, sides, an open face opposite said bottom and including an internal reflective surface. A plurality of cold cathode fluorescent lamps are situated within the housing and at least a diffuser plate is disposed over the housing. A plurality of rigid two-piece support members that contact the bottom and the diffuser plate, maintain the diffuser plate substantially parallel to the bottom of the housing. At least one of the support members is centrally disposed within in the housing and includes one of the cold cathode fluorescent lamps extending therethrough.

The present invention also provides a video image apparatus formed of a liquid crystal display and either of the backlight apparatus embodiments. In another embodiment, the present invention provides a television having a screen formed of a video display device and one of the backlight apparatus embodiments.

BRIEF DESCRIPTION OF THE DRAWING

The invention is best understood from the following detailed description when read in conjunction of the accompanying drawing. It is emphasized that, according to common practice, the various features of the drawing are not necessarily to scale. On the contrary, the dimensions of the various features are arbitrarily expanded or reduced for clarity. Like numerals denote like features throughout the specification and drawing. Included in the drawing are the following figures.

DETAILED DESCRIPTION

The invention provides a backlight apparatus that includes a housing and a diffuser plate disposed over or along an open face of the housing. One or more rigid support members are used to maintain the diffuser plate at a level orientation with respect to the housing and the uniformly arranged CCFLs within the housing. Although the subsequent figures used to illustrate the various support members of the invention, show the housing and diffuser plate in substantially horizontal positions, it is understood that illumination is provided through the open face of the housing, the diffuser and other light conditioning members which are disposed behind the video display according to the perspective of a viewer. The support member or members of the invention maintain the diffuser plate level and evenly spaced from the light sources. The video display may be a computer monitor, television screen or other video image apparatuses.

The support members extend through the housing and between a surface of the housing opposite the open face, and the diffuser plate. The support member may be formed of two components and either or both of the components may extend through openings formed in the member to which it is coupled (i.e., the diffuser plate and the opposed surface of the housing), to secure the respective portion in place. The opposed portions of the two piece support member may include cooperating male-female components to provide sturdy support and the support member may include an opening through which a lamp such as a cold cathode fluorescent lamp extends. According to this embodiment, in addition to supporting the diffuser plate, the support members secure the lamps into place, assisting in providing a uniform illumination output.

Figure 1:
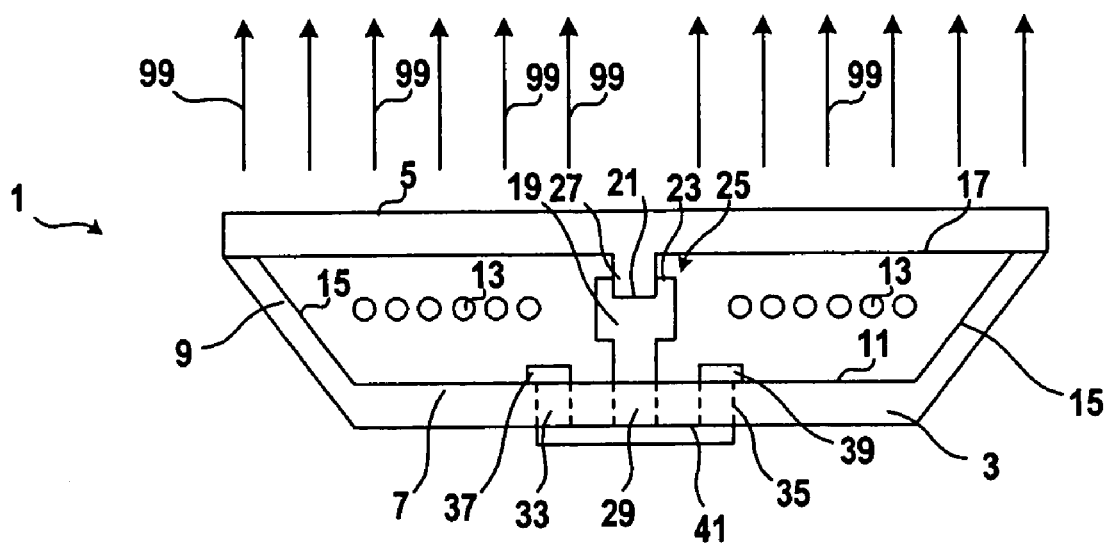
FIG. 1 is a cross-sectional view showing an exemplary backlight apparatus including a support member of the invention.

FIG. 1 is a cross-sectional view showing a backlight apparatus including an exemplary support member according to the invention. In practice, a plurality of support members may be strategically placed throughout the backlight apparatus. Backlight apparatus 1 includes housing 3 and diffuser plate 5. Housing 3 includes bottom 7 and sides 9. Housing 3 is made of rigid materials such as aluminum but other materials may be used in other exemplary embodiments. Lamps 13 extend within housing 3. In one exemplary embodiment, lamps 13 may be cold cathode fluorescent lamps (CCFLs) but other lamps may be used in other exemplary embodiments. The lamps may be elongated tubes that extend in and out of the plane illustrated in FIG. 1. To capture all of the light illuminated by the lamps 13, internal surfaces 11 and 15 of housing 3 are preferably reflective surfaces. Bottom reflective surface 11 of housing 3 is substantially planar and lamps 13 are disposed in a substantially planar arrangement which in the illustrated embodiment is substantially parallel to bottom 7 of housing 3. One or more support members 25 maintain diffuser plate 5 level with respect to, i.e. evenly spaced from, bottom 7 of housing 3 and also level respect to the plane containing lamps 13. In one embodiment, diffuser plate 5 is maintained essentially parallel to bottom 7. In the illustrated embodiment, diffuser plate 5 contacts sides 9 of housing 3, but in other exemplary embodiments diffuser plate 5 does not contact sides 9 and is supported in this level orientation solely by support members 25. Bottom 7 and bottom reflective surface 11 of housing 3 are the portions of housing 3 opposite open face 17 of housing 3. Illumination 99 is provided through open face 17. Because diffuser plate 5 is maintained in this level position, illumination 99 produced by backlight apparatus 1 is substantially uniform. Diffuser plate 5 is formed of conventional materials such as PMMA (polymethylacrylate), PC (Polycarbonate), other optical plastics and glass. Internal reflective surfaces 11 and 15 may be mirrors and they may be formed of polished aluminum in one embodiment.

Support member 25 includes upper portion 27 and lower portion 19. Upper portion 27 is an integral part of diffuser plate 5 in the illustrated embodiment, but in other exemplary embodiments, upper portion 27 may be a separate piece coupled to diffuser plate 5. Upper portion 27 is a male portion or protuberance received within recess 21 formed in lower portion 19. Recess 21 is defined by a set of opposed ribs 23. Lower portion 19 extends through and is fastened to bottom 7 of housing 3. More particularly, lower portion 19 extends through openings that are formed through bottom 7 and are adapted to receive corresponding portions of lower portion 19. Central shaft 29 (shown in dashed lines) of lower portion 19 extends through a hole sized to admit central shaft 29, and arms 33 extend through corresponding holes 35. Lower portion 19 also includes flange 37 with surface 39 that forms a substantially conterminous boundary with bottom surface 11. A securing/locking feature of the invention is effected because base surface 41 of lower portion 19 is spaced from parallel surface 39 of flange 37 by a distance approximately equal to the thickness of bottom 7. Base surface 41 and surface 39 contact opposed surfaces of diffuser plate 5. Each of lower portion 19 and upper portion 27 may be formed of various suitable light transmissive materials that are commercially available. For example, lower 19 or upper 27 portions of support member 25 may be formed of PET, polyethylene terephthalate, PMMA, other suitable acrylic resins, optical plastics, glass or other suitable materials.

While FIG. 1 illustrates illumination 99 emanating from open face 17 of housing 3, and through diffuser plate 5, it should be understood that, when installed as a backlight apparatus in a video display device, additional light conditioning members materials such as one or more diffusers, prism sheets, polarizers or other materials may be present between diffuser plate 5 and the LCD panel or other image generating device.

Figure 2:
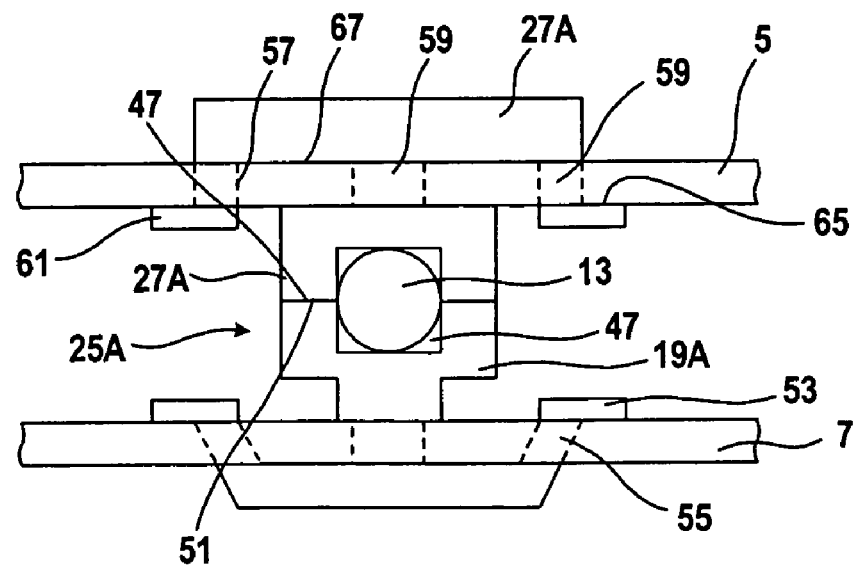
FIG. 2 is a cross-sectional view showing another exemplary backlight apparatus support member of the invention.

FIG. 2 is an exemplary embodiment of another support member of the present invention. Support member 25A consists of lower portion 19A and upper portion 27A. Upper portion 27A is in contact with diffuser plate 5 and lower portion 19A is in contact with bottom 7 of housing 3. When facing contact surfaces 49 and 51 of upper portion 27A and lower portion 19A, respectively, are joined, cavity 47 is formed within support member 25A. Cavity 47 receives lamp 13. Each of lower portion 19A and upper portion 27A include a U-shaped configuration that, when joined together, form cavity 47. In an exemplary embodiment, lamp 13 is a CCFL tube that is several inches long and it may extend through one or more support members such as exemplary support member 25A that are positioned along the particular CCFL. Support member 25A may include a thickness (depth with respect to the planar illustration of FIG. 2) of one inch or less. Lower portion 19A and upper portion 27A may each be formed of light-transmissive materials to ensure a uniformity of illumination. In one embodiment, either or both of lower portion 19A and upper portion 27A may be formed of PMMA or PET. Other suitable materials including acrylic resin materials, may be used in other exemplary embodiments.

Lower portion 19A extends through openings formed in bottom 7 and includes flanges 53 that secure lower portion 19A into place. It can be seen that arms 55 (indicated by the dashed lines) that extend through corresponding openings in bottom 7, are angled with respect to bottom 7 of housing 3. In the illustrated embodiment of FIG. 2, upper portion 27A is not an integral portion of diffuser plate 5 but, rather, it is a separate piece that extends through openings such as openings 57 formed through diffuser plate 5. More particularly, arms 59 (indicated by the dashed lines) of upper portion 27A extend through corresponding openings 57. Upper portion 27A also includes flanges 61 that help secure upper portion 27A into place. Surface 65 of flange 61 is substantially parallel to surface 67 of upper portion 27A and is spaced from surface 67 by a distance substantially the same as the thickness of diffuser plate 5 so that surfaces 65 and 67 each rest against an opposed surface of the diffuser plate 5 to secure upper portion 27A into place.

Figure 3:
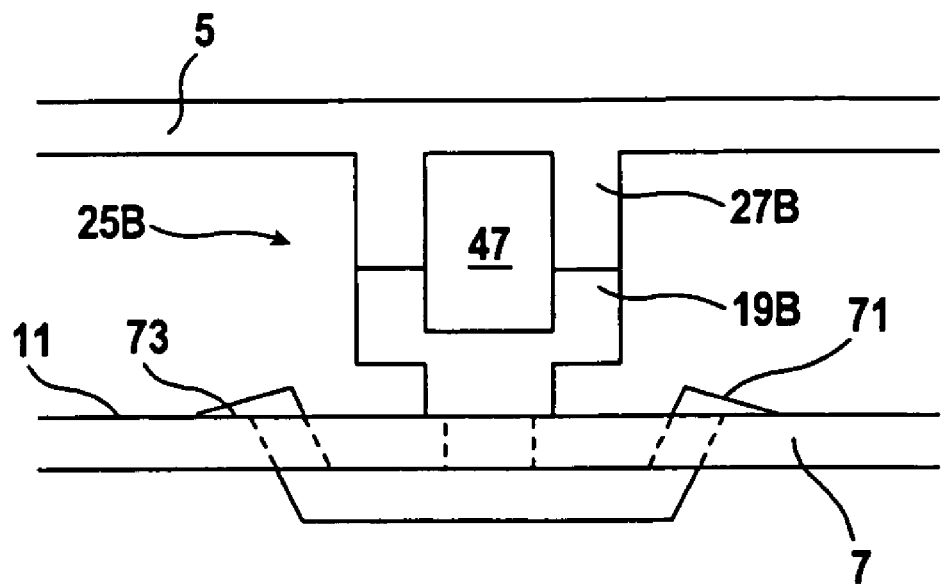
FIG. 3 is a cross-sectional view showing yet another exemplary backlight apparatus support member of the invention.

FIG. 3 shows another exemplary support member of the invention. Support member 25B includes upper portion 27B and lower portion 19B, each of which include a U-shaped configuration that form cavity 47 when upper portion 27B and lower portion 19B are joined together. Cavity 47 may receive a lamp 13 as previously shown. Upper portion 27B is an integral portion of diffuser plate 5. Lower portion 19B extends through bottom 7 of housing 3 and includes angled feet 71 that contact internal reflective surface 11 and secure lower portion 19B into place. Angled feet 71 include planar surface 73 that contacts planar internal reflective surface 11 of bottom 7.

Figure 4:
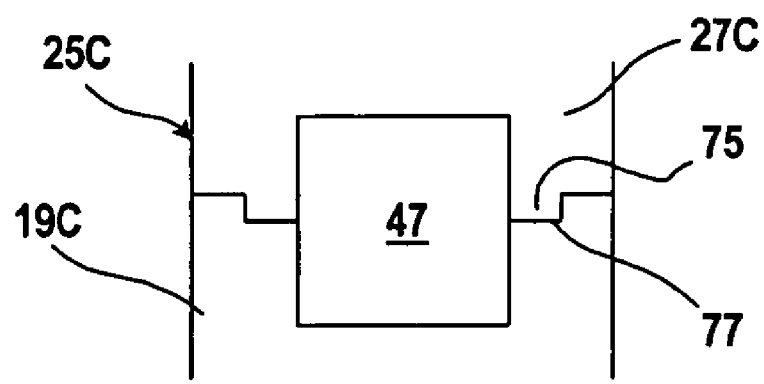
FIG. 4 is another cross-sectional view showing still another exemplary backlight apparatus support member of the invention.

FIG. 4 shows a central portion of another exemplary support member of the invention. Support member 25C consists of lower portion 19C and upper portion 27C. Lower portion 19C and upper portion 27C may be corresponding U-shaped members joined together to form cavity 47 that receives a CCFL or other lamp (not shown) extending there-through. The contact portion of upper portion 27C also includes male portion or protuberance 75 received within a corresponding female portion or recession 77 of the corresponding contact portion of lower portion 19C. This male-female feature provides additional mechanical support.

It should be understood that various other combinations of the afore-described features may also be used to form various other exemplary support members of the invention.

Figure 5:
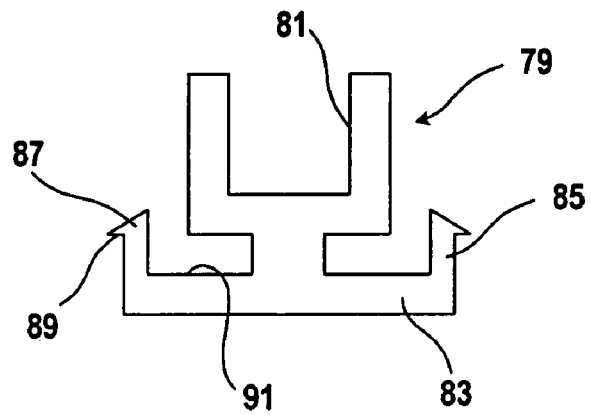
FIG. 5 is a cross-sectional view showing a portion of another exemplary support member of the invention.

FIG. 5 is a cross-sectional view of an exemplary lower or upper portion of an exemplary support member of the invention that may be formed of the afore-described exemplary materials. Portion 79 includes opening 81 which, in combination with a cooperating opposed portion, may form a cavity that receives a CCFL. Portion 79 also includes base 83, arms 85, and flanges 87. Each flange 87 includes substantially planar surface 89 which is parallel to surface 91 of base 83 and spaced from surface 91 by a distance equal to the thickness of the member through which legs 85 will extend and surfaces 91 and 89 will contact opposed sides of the member to lock portion 79 into place.

Figure 6:
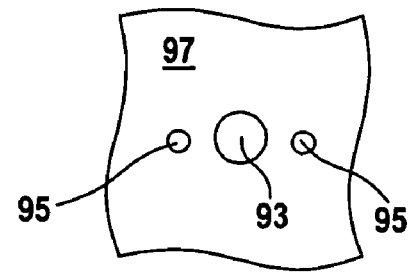
FIG. 6 is a plan view showing openings in a diffuser plate that receive a portion of the support member of the invention.

FIG. 6 is a plan view showing central opening 93 and openings 95 that extend through planar member 97 which may be previously shown diffuser plate 5 or bottom 7 of housing 3. Corresponding portions of a lower or upper portion of an exemplary support member extend through the corresponding holes to secure the support member into place.

Figure 7:
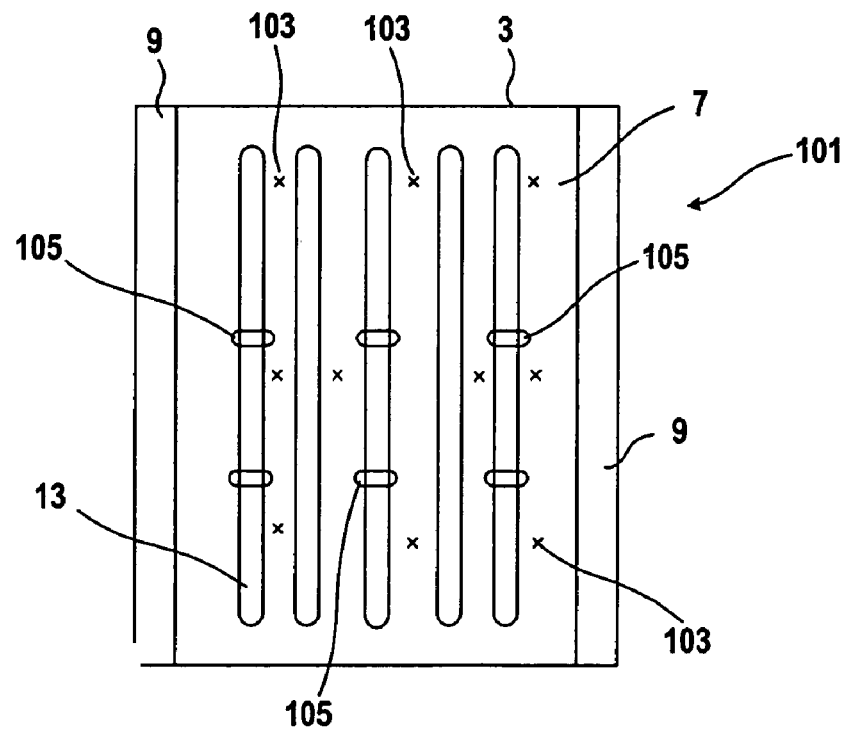
FIG. 7 is a plan view of a backlight apparatus with a plurality of support members of the invention.

FIG. 7 is a plan view showing the front of exemplary backlight apparatus 101 through an open face such as open face 17 of FIG. 1. Exemplary backlight apparatus 101 includes housing 3 with bottom 7 and sides 9. Sides 9 may be angled as shown in FIG. 1, to maximize illumination intensity. Lamps 13 extend within housing 3. Exemplary backlight apparatus 101 also includes a plurality of support members of the invention. Support members 103 disposed between lamps 13 may be support members that do not receive a lamp. Support member 25 illustrated in FIG. 1 is an example of such a support member. Support members 105 receive a CCFL or other lamp and may be previously shown exemplary support members 25A, 25B and 25C. One lamp 13 may extend through multiple support members 105. It can be seen that a plurality of support members 103 and 105 are strategically placed within backlight apparatus 101 to insure that the transparent diffuser plate (not shown) remains in a level and planar configuration over housing 3. Many of the support members 103 and 105 are centrally disposed in the housing, to maintain a specified distance between the diffuser plate and bottom in central portions. In peripheral portions, the diffuser plate may be supported by contact with the sides 9 of the housing or by peripherally disposed support members.

The backlight apparatus such as shown in FIG. 7 or other backlight apparatuses formed to include the support members of the present invention, may be installed behind a liquid crystal display such as a TFT-LCD within a television, computer or other apparatus that includes a video display screen or monitor.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A backlight apparatus comprising:
a housing with a bottom, sides and an open face opposite said bottom, and including an internal reflective surface;
at least a cold cathode fluorescent lamp within said housing;
at least a diffuser plate disposed over said housing; and
a rigid support member contacting said bottom and said diffuser plate and receiving said cold cathode fluorescent lamp extending therethrough;
wherein at least a portion of said rigid support member is fixed to said diffuser plate.

2. The backlight apparatus as in claim 1, wherein said housing has a centrally disposed main portion and a peripheral portion and said support member is disposed in said main portion.

3. The backlight apparatus as in claim 1, wherein said support member comprises a two piece support member.

4. The backlight apparatus as in claim 3, wherein said support member includes an upper portion that is an integral part of said diffuser plate.

5. The backlight apparatus as in claim 3, wherein said support member includes an upper portion that is a separate piece coupled to said diffuser plate and a lower portion that is a separate piece coupled to said bottom of said housing, said upper portion contacting said lower portion and at least one of said upper portion extending through said diffuser plate and said lower portion extending through said bottom.

6. The backlight apparatus as in claim 3, wherein said support member includes an upper portion and a lower portion, each including a U-shaped section, said respective U-shaped sections cooperating to form a cavity when said upper and lower portions are joined.

7. The backlight apparatus as in claim 6, wherein said U-shaped section of said upper portion includes a contact region that includes a protuberance received within a recess of a corresponding contact region of said lower portion.

8. The backlight apparatus as in claim 3, wherein said upper portion includes a protuberance received within a recess of said lower portion.

9. The backlight apparatus as in claim 1, wherein each of said diffuser plate and said bottom are generally flat and further comprising a plurality of further rigid support members that combine with said rigid support member to maintain said diffuser plate evenly spaced from said bottom.

10. The backlight apparatus as in claim 1, wherein said rigid support member is formed of a light transmissive material.

11. The backlight apparatus as in claim 1, wherein said rigid support member is formed of one of PET and PMMA.

12. A video image apparatus comprising a liquid crystal display and a backlight apparatus illuminating said liquid crystal display, in which said backlight apparatus comprises:
a housing including a bottom, sides, an open face opposite said bottom and including an internal reflective surface;
a plurality of cold cathode fluorescent lamps within said housing;
at least a diffuser plate disposed over said housing; and
a support member having a lower portion contacting said bottom of said housing and an upper portion integrally formed with said diffuser plate, said support member receiving one of said cold cathode fluorescent lamps extending therethrough.

13. A television comprising a video display device and a backlight apparatus illuminating said video display device, in which said backlight apparatus comprises:
a housing including a bottom, sides, an open face opposite said bottom and including an internal reflective surface;
a plurality of cold cathode fluorescent lamps within said housing;
at least a diffuser plate disposed over said housing; and
a support member that supports said diffuser plate, said support member including a lower portion extending through an opening formed in said bottom of said housing and an upper portion that is integral with said diffuser plate.

14. A backlight apparatus comprising:
a housing including a bottom, sides and an open face opposite said bottom and including an internal reflective surface;
at least a lamp disposed within said housing;
at least a diffuser plate disposed over said housing; and
a support member that supports said diffuser plate, said support member including a lower portion extending through an opening formed in said bottom of said housing and an upper portion contacting said lower portion and extending though an opening formed in said diffuser plate.

15. The backlight apparatus as in claim 14, wherein said housing has a centrally disposed main portion and a peripheral portion and said support member is disposed within said main portion.

16. The backlight apparatus as in claim 14, wherein said lamp is a cold cathode fluorescent lamp and said support member includes a cavity through which said cold cathode fluorescent lamp extends when said lower portion contacts said upper portion.

17. The backlight apparatus as in claim 14, wherein said upper portion includes a protuberance received within a recess of said lower portion.

18. The backlight apparatus as in claim 14, wherein said upper portion includes a central support shaft that extends through said opening formed in said diffuser plate and a set of fastening members with corresponding arms that extend through a corresponding set of further openings that extend through said diffuser plate to secure said upper portion to said diffuser plate.

19. The backlight apparatus as in claim 18, wherein each of said arms terminates at a flange having a first surface that bounds one surface of said diffuser plate and said upper portion includes a second surface that bounds the opposed surface of said diffuser plate, said second surface spaced apart from said first surface by a distance equal to a thickness of said diffuser plate.

20. The backlight apparatus as in claim 14, wherein said lower portion includes a set of parallel surfaces spaced apart by a distance equal to a thickness of said bottom of said housing, said set of parallel surfaces disposed on opposite sides of said bottom and coupled to one another by an arm that extends through said bottom.

21. The backlight apparatus as in claim 14, wherein at least of one of said upper portion and said lower portion is formed of one of PET and PMMA.

22. The backlight apparatus as in claim 14, wherein at least of one of said upper portion and said lower portion is formed of a light transmissive material.

23. A video image apparatus comprising a liquid crystal display and a backlight apparatus illuminating said liquid crystal display, said backlight apparatus comprising:
a housing including a bottom, sides, an open face opposite said bottom and including an internal reflective surface;
at least a lamp disposed within said housing;
at least a diffuser plate disposed over said housing; and a support member that supports said diffuser plate, said support member including a lower portion extending through an opening formed in said bottom of said housing and an upper portion contacting said lower portion and extending though an opening formed in said diffuser plate.

24. A television comprising a video display device and a backlight apparatus that illuminates said video display device, said backlight apparatus comprising:

a housing including a bottom, sides, an open face opposite said bottom and including an internal reflective surface;

at least a lamp disposed within said housing;

at least a diffuser plate disposed over said housing; and a support member that supports said diffuser plate, said support member including a lower portion extending through an opening formed in said bottom of said housing and an upper portion contacting said lower portion and extending though an opening formed in said diffuser plate.

25. A backlight apparatus comprising a housing including a bottom, sides and an open face opposite said bottom and including an internal reflective surface;

a plurality of cold cathode fluorescent lamps disposed within said housing;

at least a diffuser plate disposed over said housing; and a plurality of rigid two-piece support members, each two-piece support member contacting said bottom and said diffuser plate and maintaining said diffuser plate substantially parallel to said bottom of said housing, at least one of said support members centrally disposed within in said housing and including one of said cold cathode fluorescent lamps extending therethrough;

wherein at least one of said support member includes an upper portion that is an integral part of said diffuser plate.

* * * * *